Figure 1:
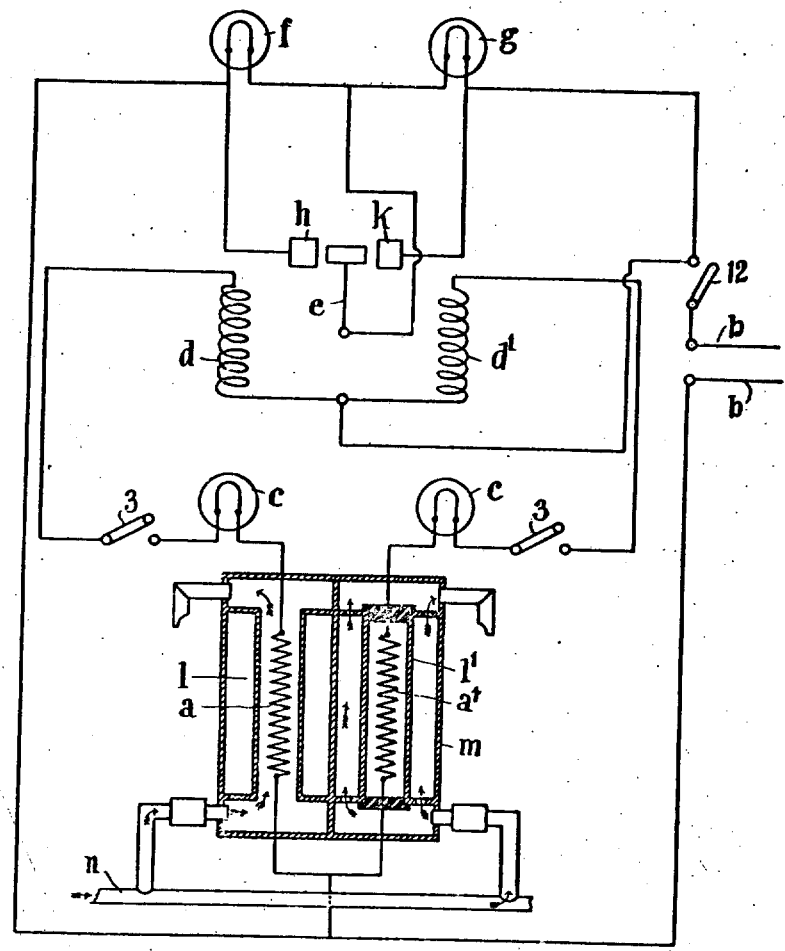

A. PHILIP & L. J. STEELE.
APPARATUS FOR DETECTING INFLAMMABLE GASES IN AIR.
APPLICATION FILED SEPT. 9, 1907.

899,068.

Patented Sept. 22, 1908.

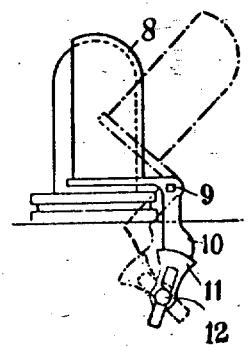
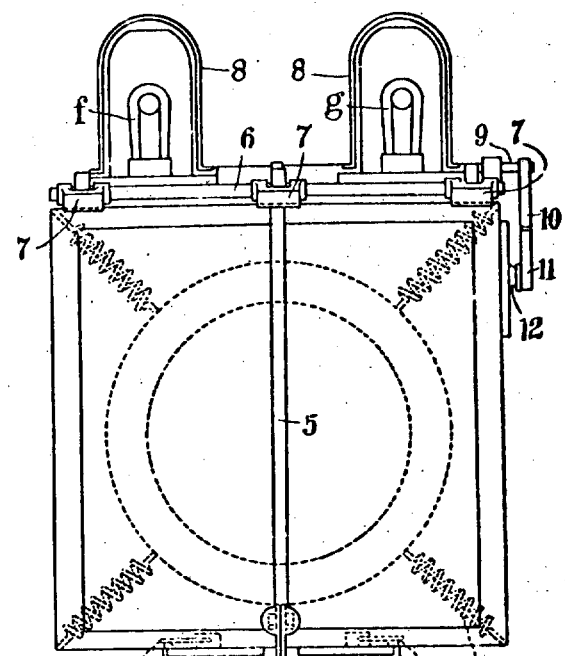
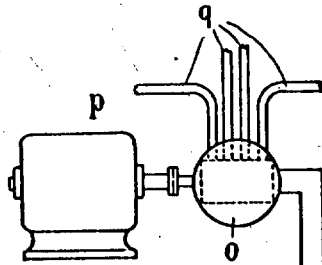

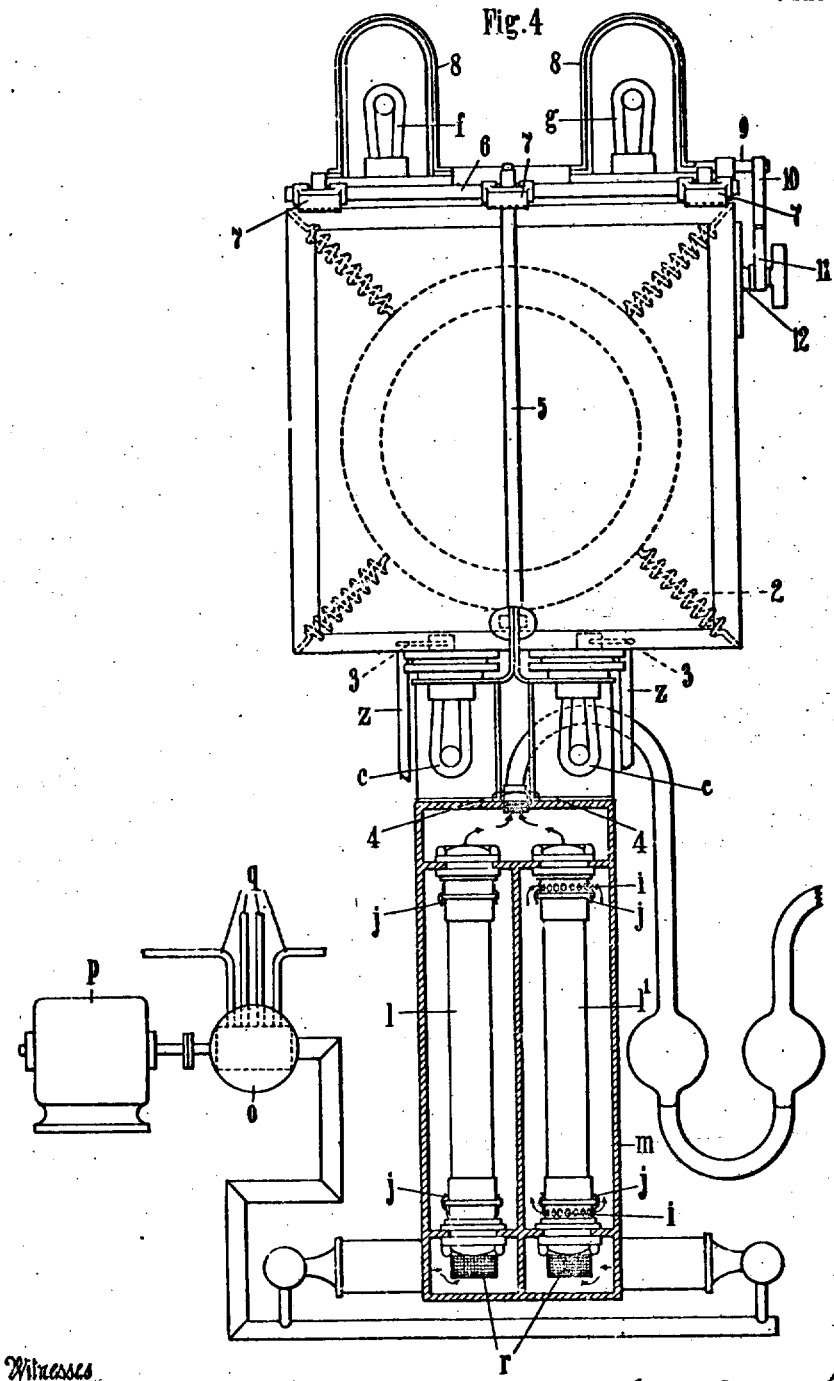

UNITED STATES PATENT OFFICE.

ARNOLD PHILIP AND LOUIS J. STEELE, OF PORTSMOUTH, ENGLAND.

APPARATUS FOR DETECTING INFLAMMABLE GASES IN AIR.

No. 899,068.　　　Specification of Letters Patent.　　　Patented Sept. 22, 1908.

Application filed September 9, 1907. Serial No. 391,990.

*To all whom it may concern:*

Be it known that we, ARNOLD PHILIP, B. Sc., chemist, and LOUIS JOHN STEELE, M. I. E. E., electrical engineer, subjects of the King of Great Britain, both residing at His Majesty's dockyard, Portsmouth, in the county of Hampshire, England, have invented new and useful Apparatus for Detecting Inflammable Gases in Air, of which the following is a specification.

This invention relates to an improved apparatus for the detection of combustible gases or vapors.

The apparatus comprises a detector of the type in which the activity of a catalytic substance is utilized to put the indicator in action—a system of pipes extending from this detector to any desired parts of the space to be protected, and a pump of suitable type to draw air through these pipes and supply it to the detector.

Various improvements are also made in details of the apparatus. For example the electrical devices employed in the detector are so arranged that the actuation of the apparatus shall be attended with a minimum of sparking and moreover these devices are protected by casings and so forth which prevent access to parts where a circuit may be broken except after the opening of a switch controlling those parts.

Minor details are designed to prevent as far as possible injury to the apparatus or to indicate when the apparatus has been put out of order.

The invention is illustrated in the accompanying drawings in which—

Figure 1 is a diagram of the electrical circuits employed in one form of the apparatus. Fig. 2 shows an external view of that apparatus, Fig. 3 is a detail thereof, and Fig. 4 a slightly modified form.

In the form shown in Figs. 1, 2 and 3 a wire $a$ of sensitive metal is arranged in parallel with the resistance $a'$ in an electrical circuit supplied with power from the mains $b$. In each branch of the circuit is inserted a lamp $c$ or other indicator which serves to show by inspection whether any breakage has taken place in that branch of the circuit in which it is placed, and also a solenoid $d$ or $d'$ both of these solenoids acting on one pivoted armature $e$. Two main indicating lamps $f, g$ of which $f$ is red and $g$ white, are arranged in series between the same or other supply mains. The common terminal of the lamps $f, g$, is joined to a contact on the armature $e$ while the other terminals come to contacts $h, k$ against which the contact on the armature $e$ is pressed when the armature is drawn to one side or other through the action of the solenoids $d, d'$. The solenoids or electromagnets with their pivoted armature are preferably arranged in a casing suspended on springs or the like as illustrated so that the apparatus is not likely to operate when jarred or tilted. The wires $a, a'$ are inclosed in tubes $l, l'$ secured by clips $j$ within a casing $m$ as shown in Fig. 4 so that if either of them should break they may be replaced without delay by insertion of a spare tube. Air is supplied to the casing through the tube $n$ and passes through the tube $l$—entering at the holes $i$ and leaving by the holes $i'$—but around the tube $l'$. The action of this type of apparatus is well understood. Initially the resistances of the wires $a, a'$ are so balanced that when the normal stream of air is passing the solenoids $d, d'$ exert a force which draws the armature $e$ to the left against contact $h$ so that the red lamp $f$ is short circuited. When owing to the presence of inflammable gas in the air passing through the apparatus the wire $a$ becomes more highly heated its resistance increases and the current through the solenoid $d$ therefore diminishes, the armature $e$ is drawn to the right against contact $k$, short circuiting the lamp $g$ and breaking the short circuit across the lamp $f$.

As shown in Fig. 2 the air is supplied to the apparatus by a pump $o$ driven by a motor $p$, the air being drawn from all parts of the space to be guarded by tubes $q$. Before entering the casing containing the tubes $l, l'$ the air passes through filters $r$ containing asbestos or other suitable material and also through two or three sheets of wire gauze. The filters are preferably contained within the casing $m$ so as to be kept warm; this will prevent any tendency to condense the petrol that may be present. Naturally the material employed in the filter must not be such as would absorb or combine with the petrol. The air emerges from the apparatus through sheets of gauze and then by tubes $s$ which are bent so as to prevent any obstacle being thrust into them as seen in Fig. 2. Alternatively a single tube may conduct the air from the casing as in Fig. 4 and this tube may terminate in a suitable U-tube or the like containing suitable non-volatile liquid such as high flash-point oil or a mixture of glycerin and water, through which the air bubbles. Such a device serves to indicate whether the pump is in working order and the air circulating properly, but should be so arranged that it does not introduce a great back-pressure, such as to hinder the passage of the air. The object of the gauze sheets is mainly to prevent an explosion or ignition of gas in the instrument from passing to the outside.

It will be obvious that with an apparatus of this nature it is essential to take precautions against the inflammable gases which may be present being ignited by sparks or the like from the apparatus itself. For this purpose the whole of the apparatus is inclosed and means are provided for insuring that the switches controlling the variable circuits shall be broken before any part of the apparatus can be opened. Thus in front of the tubes $l, l'$ is a door $t$ supported on hinges $u$. This door is normally held closed by a bar $v$ and lugs $w$ attached to a vertical rod $x$. The rod $v$ and the lugs $w$ press the door tightly down against an india rubber or other strip on the inside so as to make it airtight.

Two plates $y$ are arranged to fold over the door one covering the spring catch by which the bar $v$ is engaged. These plates are attached to vertical rods $z$ which pass up to the casing 2 above. Just within this casing are switches 3, 3, shown in Fig. 1 and the contact pieces of these switches are attached to the vertical rods $z$ so that when the plates $y$ are turned aside to allow the opening of the door $t$ the switches 3, 3 are opened. To the rods $z$ are also attached guards 4 which cover the lamps $c$ in such a way that neither of these lamps can be removed to be replaced by a fresh one until its guard is turned aside and thus its switch opened. Similar provisions are made for shutting up the casing 2, there being a bar 5 as before stretched across the door and mounted upon a rod 6 with lugs 7.

Extensions from the guards 4 cover the end of the rod 5 or rather the spring catch which engages it, in order to insure the switches 3, 3, being opened before the casing 2 can be opened. The lamps $f, g$ are also protected by guards 8 pivoted upon a rod 9 which carries a projection 10 adapted to engage with the metal piece 11 upon the axle of the main switch 12. Thus if either of these lamps has to be removed its guard has first to be turned aside and the main switch opened. Moreover the switch cannot again be closed until the guards are in their proper positions.

It will be evident that the type of detector device may be considerably modified and still serve the purpose of the invention. The indication may be given by any other change in the physical properties of the wire resulting from the heating.

What we claim is:—

1. In an apparatus for the detection of combustible gases, the combination of a catalytic agent and means for heating same, with parallel electrical resistances one including a catalytic agent and adapted to be varied by the catalytic action, a relay with two parallel coils each in series with one of said resistances, indicating lamps, connections between said lamps and a source of electric supply, an armature operated by said relay and means for causing said armature to short circuit one of said lamps, with a system of pipes and means for drawing gases through said pipes and passing them over the catalytic agent.

2. In an apparatus for the detection of combustible gases, the combination of a catalytic agent and means for heating the same, a system of pipes, means for drawing gases through said pipes and passing them over the catalytic agent, electrical devices adapted to be effected by the catalytic action of said agent, with casings and guards for protecting said devices, a source of electrical power, circuits including said source and the electrical devices, switches in said circuits adapted on opening to separate respective devices from the source of power, and means for effecting the opening of said switches when the protection of their respective devices is disturbed.

3. In an apparatus for the detection of combustible gases, the combination with parallel electrical resistances one adapted to be varied by catalytic action, a relay with two parallel coils each in series with one of said resistances, indicating lamps, a source of supply, connections between said lamps and a source of supply, an armature operated by said relay and means for causing said armature to short circuit one of said lamps, of guards and casings for protecting said resistances and lamps, switches arranged in the circuits of said resistances and lamps, and mechanical connections between the switches and the guards and casings whereby any switch is opened upon the disturbance of the corresponding protective device.

4. In an apparatus for the detection of combustible gases, the combination with a catalytic agent, means for heating same and means for demonstrating the activity of said agent, of apparatus for causing the air to be tested to pass over the catalytic agent, a U-tube arranged to form part of the path of the air and a non-volatile liquid in said tube through which the air bubbles, whereby an indication is given that circulation of air is proceeding.

5. In an apparatus for the detection of combustible gases, the combination of a catalytic agent and means for heating same, electrical devices for demonstrating the activity of said agent, means for causing the air to be tested to pass over said agent, means for indicating that the circulation of air is proceeding, with guards for protecting said electrical devices, a source of electrical power, circuits including the electrical devices, switches in said circuits, and connections between said switches and the guards whereby any switch is opened when the corresponding guard is removed.

6. In an apparatus for the detection of combustible gases, the combination with a catalytic agent, means for heating same and means for demonstrating the activity of said agent, of apparatus for causing the air to be tested to pass over the catalytic agent, a vessel adapted to contain liquid arranged in the path of the air passing from said catalytic agent, and a non-volatile liquid in said vessel through which the air must pass, whereby an indication is given that circulation of air is proceeding.

7. In an apparatus for the detection of combustible gases, the combination of a catalytic agent, means for heating same and means for demonstrating the activity of said agent, with apparatus for causing the air to be tested to pass over the catalytic agent, a filter containing material which neither evolves nor absorbs combustible gases arranged in the path of the air proceeding to the catalytic device, a U-tube in the path of the air leading to the catalytic device and a non-volatile liquid in said tube to give an indication that circulation of air is proceeding.

8. In an apparatus for the detection of combustible gases, the combination of a catalytic agent and means for heating same, electrical devices for demonstrating the activity of said agent, with a system of pipes, means for drawing gases through said pipes, and passing them over the catalytic agent, a filter containing material which neither evolves nor absorbs combustible gases arranged in the path of the air proceeding to the catalytic agent, a U-tube in the path of the air leading to the catalytic agent, and a non-volatile liquid in said tube to give an indication that circulation of air is proceeding.

9. In an apparatus for the detection of combustible gases, the combination of parallel electrical conductors one adapted to be varied by catalytic action, means for supplying air to the apparatus, means for catalytically effecting the combustion of inflammable material contained in said air, a relay with two parallel coils each in series with one of said conductors, indicating lamps, a source of electric supply and connections between said source and the lamps, means controlled by a relay for short circuiting one of the lamps, switches in the circuits of the lamps and conductors, guards for protecting said lamps and conductors, connections between said switches and the guards whereby each switch is opened when the corresponding guard is moved, with a device for filtering the air supplied to the apparatus through a material which neither evolves nor absorbs combustible gases, a U-tube in the path of the air leading to the apparatus, and a non-volatile liquid in said tube to give an indication that circulation of air is proceeding.

10. In an apparatus for the detection of combustible gases, the combination of two electrical conductors of catalytically active material, a source of electrical power, connections between said conductors and the source whereby the former are adapted to receive in parallel a current which heats them, means for indicating the further heating through catalytic action, tubes inclosing said conductors, a casing to contain said tubes, and easily removable catches to hold the tubes with means for supplying air to the casing and passages in the casing adapted to allow the air to pass through one tube but only around the other.

11. In an apparatus for the detection of combustible gases, the combination of two electrical conductors of catalytically active material, means for heating said conductors, means for indicating their further heating through catalytic action, easily removable tubes inclosing said conductors, a casing to contain said tubes with passages allowing air to pass through one tube but only around the other, with means for supplying air to the casing, a filter in the path of the air proceeding to the casing and a device in the path of the air leaving the casing for indicating that circulation is proceeding.

In witness whereof we have signed our names to this specification in the presence of two subscribing witnesses.

ARNOLD PHILIP.
LOUIS J. STEELE.

Witnesses:
HUBERT A. GILL,
LEONARD E. HAYNES.